United States Patent [19]

van den Pol

[11] Patent Number: 4,737,063
[45] Date of Patent: Apr. 12, 1988

[54] APPARATUS FOR LOADING AND UNLOADING AN EXCHANGEABLE PLATFORM, CONTAINER OR THE LIKE ONTO A VEHICLE

[75] Inventor: Aart A. van den Pol, Nijkerk, Netherlands

[73] Assignee: De Ark B.V., Netherlands

[21] Appl. No.: 921,597

[22] Filed: Oct. 21, 1986

[30] Foreign Application Priority Data

Oct. 21, 1985 [GB] United Kingdom ............... 8525899

[51] Int. Cl.⁴ .............................. B65J 1/20; B60P 1/64
[52] U.S. Cl. .................................. 414/346; 198/731; 414/345; 414/500
[58] Field of Search ............... 414/498, 499, 500, 494, 414/345, 346, 349, 350; 198/731

[56] References Cited

U.S. PATENT DOCUMENTS

| | | | |
|---|---|---|---|
| 3,217,914 | 11/1965 | Aldropp | 414/499 |
| 3,467,268 | 9/1969 | Corompt | 414/494 |
| 4,058,231 | 11/1977 | Visa et al. | 414/499 X |

FOREIGN PATENT DOCUMENTS

| | | |
|---|---|---|
| 0002056 | 5/1979 | European Pat. Off. . |
| 1957723 | 11/1969 | Fed. Rep. of Germany . |
| 306816 | 7/1955 | Switzerland ............ 414/500 |
| 447932 | 11/1967 | Switzerland . |
| 1374222 | 11/1974 | United Kingdom . |
| 1474322 | 5/1977 | United Kingdom . |

Primary Examiner—Leslie J. Paperner
Assistant Examiner—Stuart J. Millman
Attorney, Agent, or Firm—Arnold, White & Durkee

[57] ABSTRACT

Apparatus for loading and unloading an exchangeable platform, container or the like onto and off a tipping frame of a vehicle, the rearward end of said tipping frame being connected through a shaft to the vehicle frame and said tipping frame being tiltable in relation to the vehicle frame by at least one cylinder/piston combination. The tipping frame comprises an endless chain arranged to run around a motor driven chain wheel at one end of the tipping frame and a chain wheel of otherwise embodied wheel at the other end of the tipping frame, whereby a separate auxiliary tail is connected with one end thereof to the endless chain and with the other end thereof to a hook-shaped engaging member designed to become engaged to the platform, container or the like. The engaging member comprises a section having a ridge which during unloading of the exchangeable platform, container or the like will become inserted between the link elements of the endless chain, such that during unloading the movement of said endless chain is transferred through said inserted ridge of said section of the engaging member onto said engaging member and through said engaging member onto the exchangeable platform, container or the like.

20 Claims, 6 Drawing Sheets

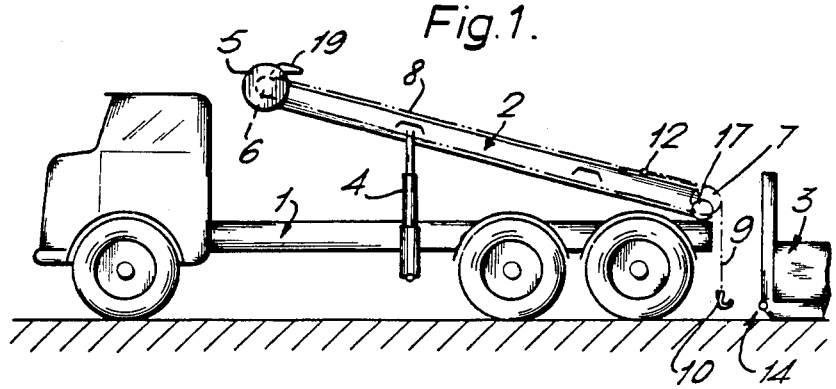
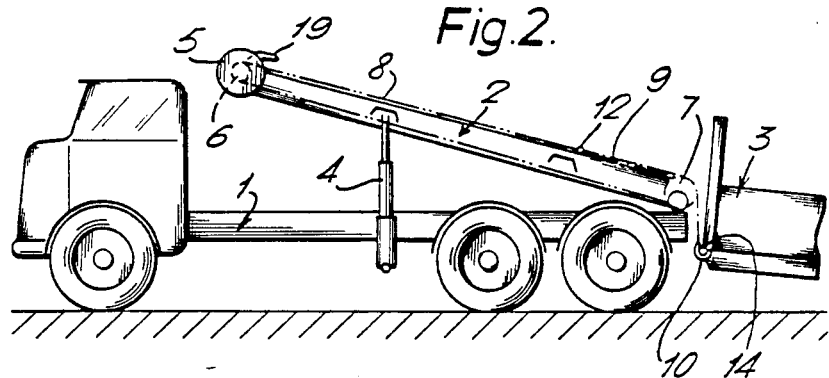
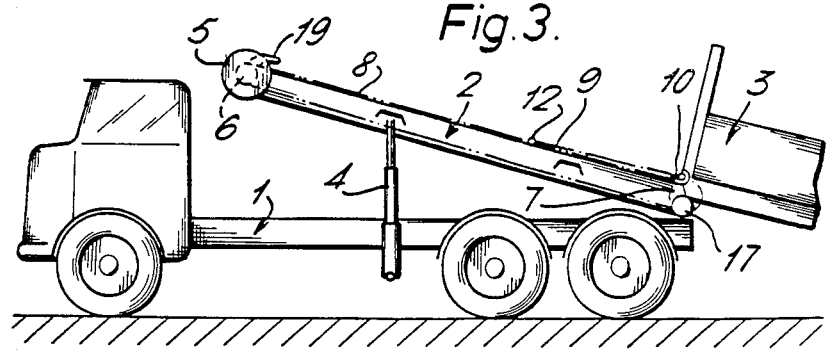

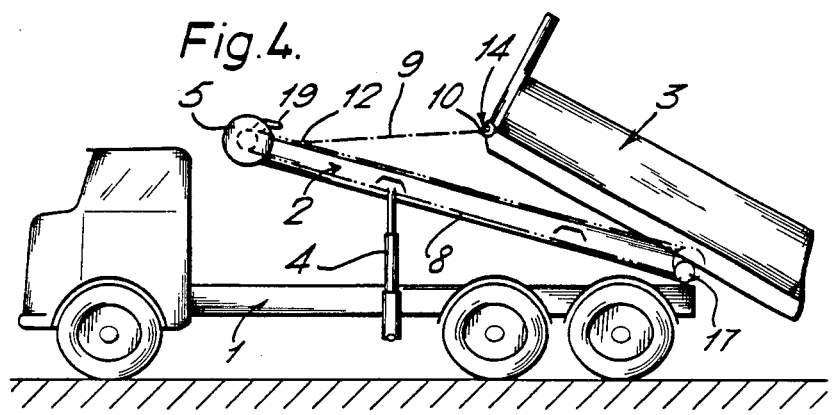
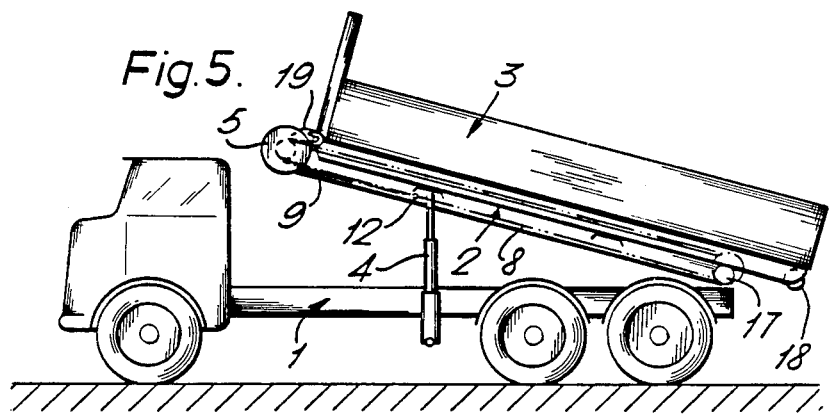
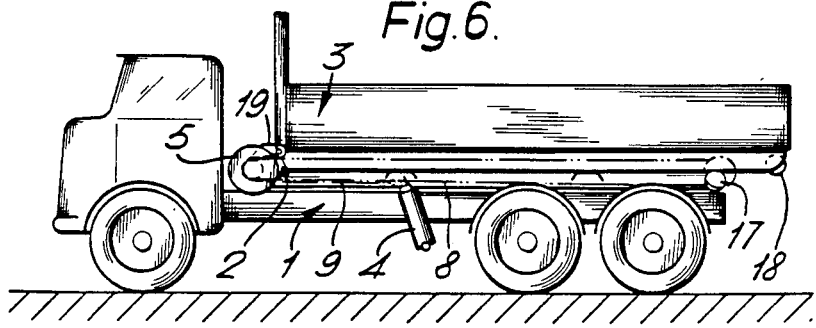

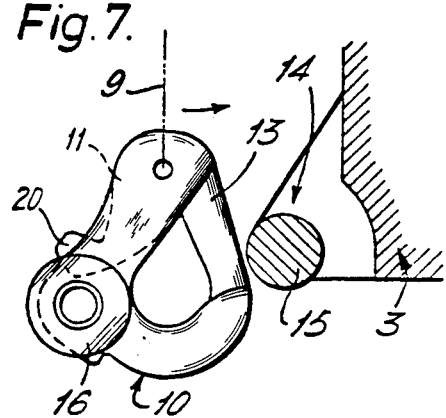
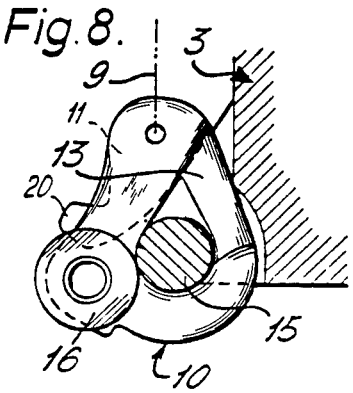
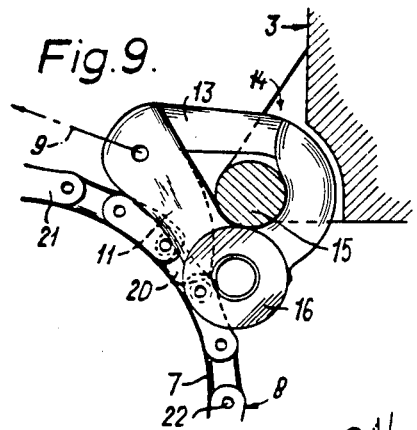
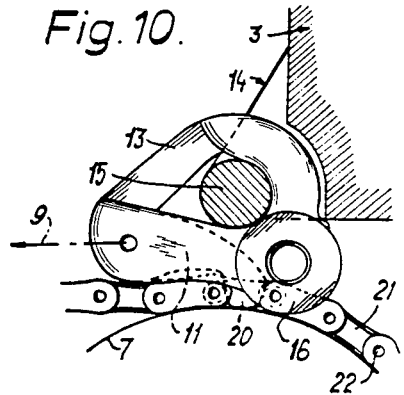
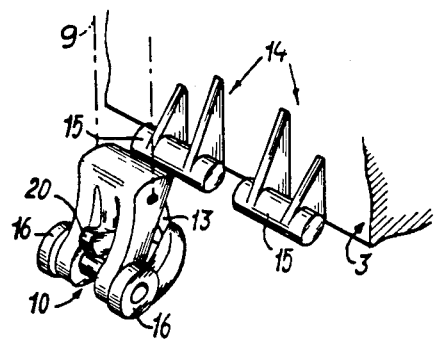

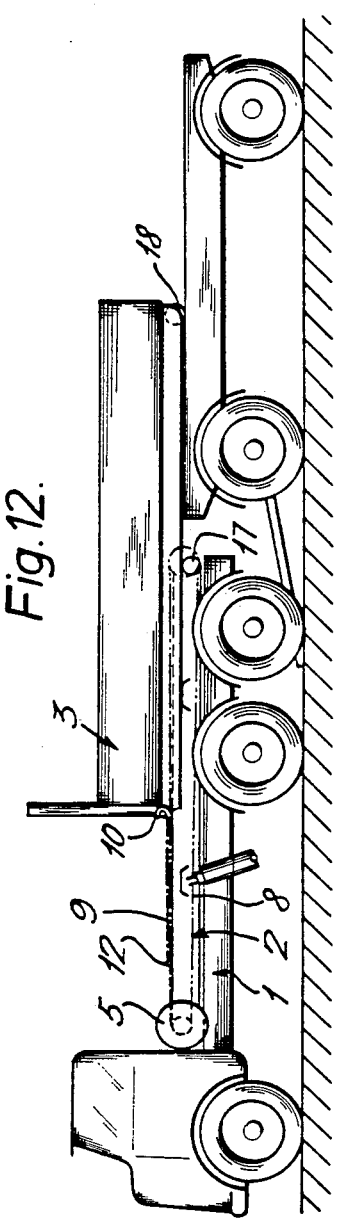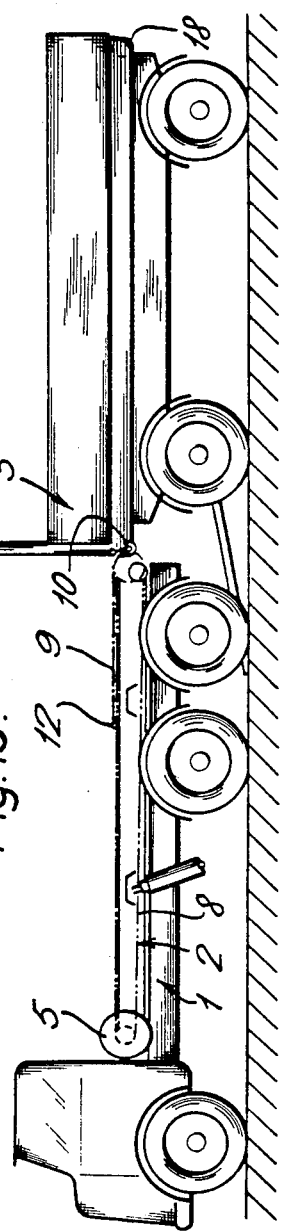

APPARATUS FOR LOADING AND UNLOADING AN EXCHANGEABLE PLATFORM, CONTAINER OR THE LIKE ONTO A VEHICLE

The invention relates to an apparatus for loading and unloading an exchangeable platform, container or the like onto and off a tipping frame of a vehicle, the rearward end of said tipping frame being connected through a shaft to the vehicle frame and said tipping frame being tiltable in relation to the vehicle frame by at least one cylinder/piston combination, said tipping frame comprising an endless chain arranged to run around a motor driven chain wheel at one end of the tipping frame and a chain wheel of otherwise embodied wheel at the other end of the tipping frame, whereby a separate auxiliary tail is connected with one end thereof to the endless chain and with the other end thereof to a hook-shaped engaging member designed to become engaged to the platform, container or the like.

An apparatus of this type is known from the Dutch Pat. No. 167635.

In this known apparatus the endless chain comprises an outwards protruding ridge which is connected to the endless chain at such a location that this ridge during the unloading of a platform, container or the like can cooperate with the hook-shaped engaging member to push the platform, container or the like off the tipping frame through said engaging member. A condition in this construction is that the length of the auxiliary tail is equal to the distance between the location where the auxiliary tail is connected to the endless chain and the location where the pawl is connected to the endless chain.

A disadvantage of this apparatus is caused by the stretching, to which the auxiliary tail appears to be subjected during operation. Because of this stretching the auxiliary tail will gradually grow larger resulting in a situation in which the cooperation between said pawl and the hook-shaped engaging member becomes disturbed such that it becomes necessary to replace the auxiliary tail. During replacement of the auxiliary tail, irrespective of the reason why the tail is replaced, one has to pay attention to the location where the auxiliary tail is connected to the endless chain because the distance between this connecting location and the pawl, connected to the endless chain, has to be equal to the length of the auxiliary tail. This requires therefore a certain degree of accuracy and attention of the personnel carrying out the replacement and therefore is a source of errors and to be considered as a disadvantage. Furthermore it is impossible to connect the auxiliary tail to the endless chain at an arbitrary location. To start with the endless chain will have to be brought into a suitable position and this hampers the assemblage.

In such an apparatus furthermore the pawl is in generally not embodied as a separate part, connected by means of separate mounting means to the chain, but will form an integral part of one of the link elements of the endless chain. The use of such special parts in a chain of which the other parts are standard components. is also considered a disadvantage.

An object of the invention is now to eliminate these disadvantages at least partly. Said object is in agreement with the invention fulfilled in that the engaging member comprises a section having a ridge which during unloading of the exchangeable platform, container or the like will become inserted between the link elements of the endless chain, such that during unloading the movement of said endless chain is transferred through said inserted ridge of said section of the engaging member onto said engaging member and through said engaging member onto the exchangeable platform, container or the like.

In this embodiment it is not necessary anymore to fix or integrate a pawl to the endless chain and when the auxiliary tail is replaced it is not necessary to pay attention to the location of the pawl.

Within the scope of the invention the engaging member may comprise a fixed section with a protruding ridge preferably comprising a self-seeking nature, which ridge already during the loading operation will become inserted between the link elements of the endless chain. With such an embodiment a number of the above indicated disadvantages are eliminated, however, the stretching in the chain may lead to a situation in which during the loading procedure the auxiliary tail will become slackened after the ridge is inserted between the link elements of the endless chain. If during the loading procedure the front end of the container, platform or the like becomes detached for a short time from the endless chain, a situation which is normal during the practical operation of the apparatus, then the weight of the container, platform or the like has to be carried suddenly by the auxiliary tail which is pulled taut with a jerk. This applies a heavy momentaneous load both on the auxiliary tail as on the endless chain and on the connection between both chains, which is considered a disadvantage. Also the wear of the ridge and of the link elements in between which the ridge becomes inserted will increase in case the length of the auxiliary tail is gradually changing during operation because of said stretching phenomenon.

Therefore it is within the scope of the invention preferred that said section of the engaging member is pivotably connected to the engaging member such, that the ridge is able to move between a position in which the ridge is inserted between the link elements of the endless chain and a position in which the link elements are free to pass said ridge.

Further preferred embodiments and other details of the invention will be explained in the following with reference to the accompanying drawings.

FIGS. 1-6 show a number of different stages during the loading of a container onto the tipping frame of a vehicle.

FIGS. 7-10 show the position of a hook-shaped engaging member, the coupling means and the endless chain in a number of stages during the loading of the container.

FIG. 11 shows a perspective view of the engaging member and the connecting means in the embodiment of the FIGS. 7-10.

FIGS. 12 and 13 show a number of stages during the removal of a container from the vehicle onto a trailer.

Figure 14:
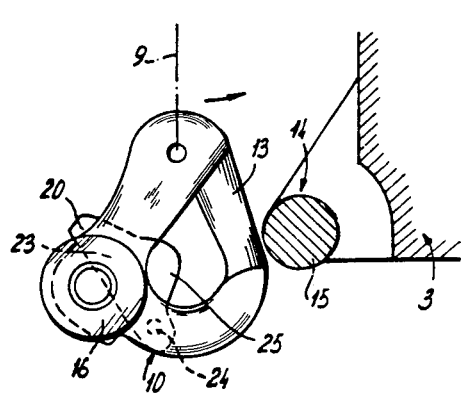
FIGS. 14-17 show the position of the hook-shaped engaging member, the coupling means and the endless chain in a number of stages during the loading of a container using a second embodiment of the engaging member.
Figure 15:
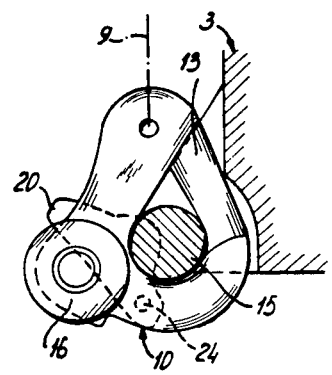
Figure 16:
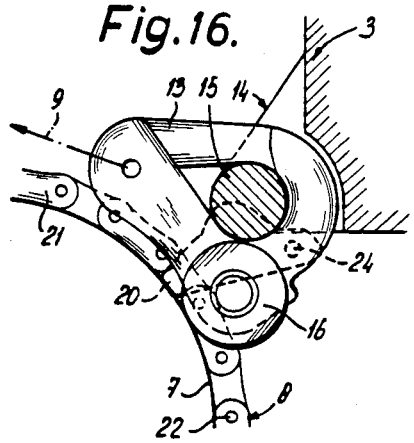
Figure 17:
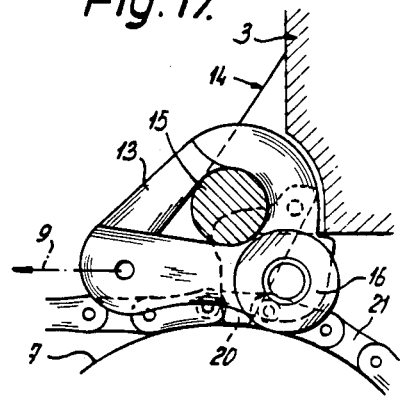

As shown in the FIGS. 1–6 a tipping frame 2 is arranged onto the chassis 1 of vehicle. This tipping frame is near the rear edge of the vehicle chassis 1 rotatably connected to said chassis through a not illustrated shaft and can be brought into a tilted position by means of one or more cylinder/piston combinations 4. The tipping frame 2 comprises an endless chain 8 running around a chain wheel 6 at the front of the tipping frame and a chain wheel or otherwise embodied wheel 7 at the rear of the tipping frame. The chain wheel 6 at the front of the tipping frame 2 is driven by an hydraulic motor 5. It is remarked that instead thereof also the rear wheel 7 can be embodied as the driven wheel in which case the hydraulic motor has to be positioned near the rear of the tipping frame.

At the point 12 a auxiliary tail 9 is connected to the endless chain. The other end of said auxiliary tail comprises a hook-shaped engaging member 10 which will be discussed in more detail. The engaging member 10 is destined to couple with one or more coupling elements 14, which for that purpose are mounted to the lower side of a platform, container or the like, and are indicated in the Figure with reference number 3.

Before the specific embodiment of a number of parts of this whole apparatus, especially the embodiment of the hook-shaped engaging member, will be discussed in more detail, first of all the functioning of this apparatus during the loading procedure will be described.

In FIG. 1 the tipping frame 2 is tilted to an inclined position and the endless chain 8 is moved by means of the drive motor 5 to such a position that the engaging member 10 at the end of the auxiliary tail 9 reaches approximately to the ground at the height of the coupling element 14 of the container 3. Thereafter the vehicle is moved backwards over a short distance such that the engaging member 10 will become coupled to the connecting element 14. Thereafter the direction of movement of the hydraulic motor 5 is reversed and the container 3 will be pulled upwards, hanging onto the auxiliary chain 9, as is illustrated in FIG. 2. The auxiliary chain 9 is embodied such that this chain is also guided by a roll or rolls 7 at the rear of the tipping frame 2. As a result thereof the front end of the container 3 will be pulled onto the tipping frame as is illustrated in FIG. 3. For a suitable support of the bottom of the container preferably supporting rolls or guiding rolls 17 are present cooperating with parts of the bottom of the container.

During the further movement of the endless chain 8 the container will be pulled further and further onto the tipping frame. Thereby the situation which is schematically indicated in FIG. 4, may occur whereby the container only rests against the tipping frame near the rear edge thereof and has a position which is more inclined than the inclination of the tipping frame. Continued pulling movement will, because of displacement of the center of gravity, result into a lowering of the front edge of the container and the container will return back onto the tipping frame. The situation as illustrated in FIG. 4 can be avoided by a further tilting movement of the tipping frame which, however, is not always possible.

In FIG. 5 the platform 3 is completely pulled onto the tipping frame and the coupling element 14 or another specifically designed element is moved underneath the locking hook 19 so that the platform is locked onto the tipping frame. Finally the tipping frame is moved back to the horizontal position by means of the cylinder/piston combination(s) 4 reaching thereby the ultimate situation schematically illustrated in FIG. 6. Thereafter the container 3 can be transported by means of the vehicle.

A first embodiment of the engaging member is illustrated in FIGS. 7 until 10 in which also the cooperation between this engaging member and the coupling element of the container is illustrated whereas FIG. 11 shows a perspective view of the engaging member in the first embodiment thereof.

In FIG. 11 an embodiment of the coupling means 14 is illustrated attached near the lower front side of the platform 3. The coupling means 14 comprises in this embodiment two horizontal, preferably round rods 15, which are running parallel to the lower front edge of the platform 3 at some distance thereof and are connected to the platform 3 near said front edge. Between the opposed ends of the rods a space is left open in which a self-directing wedge-shaped section 13 of the hook-shaped engaging means may fall in. By means of this wedge the hook is maneuvered into the correct position even in case the vehicle is not correctly aligned during the backwards movement thereof. Preferably the opposed ends of the rods 15 are somewhat bevelled to improve the self-positioning function of the engaging member 10 in relation to the coupling means 14.

The engaging member 10 itself consists in principle of two hook-shaped sections which through transversal sections are connected to each other and are maintained at a distance of each other. The already mentioned wedge-shaped element 13 forms part of or is connected to one of these transversal sections. This construction can in general be considered as a U-shaped construction and the intention thereof is that both hook-shaped side sections or side parts during operation become positioned at both sides of the endless chain, in other words, that the endless chain during operation becomes positioned within the internal space in the U-shaped hook 10.

The engaging member 10 furthermore comprises circular guiding sections 16 cooperating with for instance the chain wheel 7 during the passage of this wheel. These guiding sections 16 can also cooperate with eventual further guiding elements positioned alongside the endless chain 8.

In the embodiment of the FIGS. 7 through 11 the engaging member further comprises a section 11 carrying at the end thereof the ridge 20. This ridge 20 is embodied such that it will fit in the intermediate space between the link elements of the endless chain 8 as will be described below. The section 11 is fixedly connected to the hook-shaped side sections or is integrally formed with these sections.

FIG. 7 illustrates the situation in which the engaging member 10 is positioned directly in front of the coupling element 14 of the container (the situation which is comparable with FIG. 1). By moving the vehicle backwards the engaging member 10 will become coupled to the coupling means 14 and if thereafter the auxiliary chain 9 is pulled upwards then the engaging member 10 will take the position as illustrated in FIG. 8. Both hook-shaped side sections engage each one of the rods 15 and the positioning wedge 13 is located between those rods.

By pulling the auxiliary tail 9 further upwards by means of the endless chain 8 a situation will be reached in which the engaging member 10 will take a position on the endless chain 8. Thereby the ridge 20 will become inserted into the intermediate space between two link elements of the endless chain as is illustrated in FIG. 9. The shape of the ridge 20 has to be such that this ridge fits into the intermediate space which is left open by the shafts 22 and the opposed side plates 21 of the chain 8.

The continuing movement of the endless chain 8 results finally in a positioning of the engaging member as illustrated in FIG. 10 which position in relation to the chain 8 will be maintained during the further movement to the ultimate position illustrated in FIG. 6.

FIGS. 12 and 13 illustrate in which way by means of the apparatus according to the invention a platform, container or the like can be pushed off a vehicle for instance onto a trailer or onto the ground. Starting from the situation which is illustrated in FIG. 6 the direction of movement of the motor 5 is reversed. Thereby the endless chain 8 will take the ridge 20 along to the right in the Figures and will move thereby the engaging element as well as the container, platform or the like in backwards direction (to the right in the Figures). The auxiliary tail 9 has no function during this operation. If the backwards movement is carried out with the purpose of pushing the container 3 from the vehicle onto the ground, whereby the tipping frame is brought into an inclined position, the situation as illustrated in FIG. 4 may occur in which the tail 9 of course has a very clear function.

If during the use of the engaging member 10 in the embodiment according to the FIGS. 7–11 the auxiliary tail is elongated as result of stretching, then it is not inconceivable that the ridge 20, irrespective of the self-seeking nature thereof, will not become inserted anymore into the intermediate space between the link elements of the chain 8, but will come to rest on the link elements. The loading procedure is not hampered thereby. At the start of the unloading procedure the endless chain 8 will be set in motion so that the chain 8 is moving in relation to the engaging member 10 and already after a few millimeters the ridge 20 will become inserted into the intermediate space between the link elements of the chain 8 and said ridge will be taken along in the described way. However, this could be considered as a disadvantage.

Figure 18:
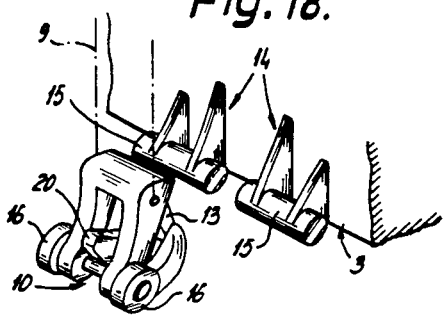
FIG. 18 shows a perspective view of the engaging member in the second embodiment.
Figure 19:
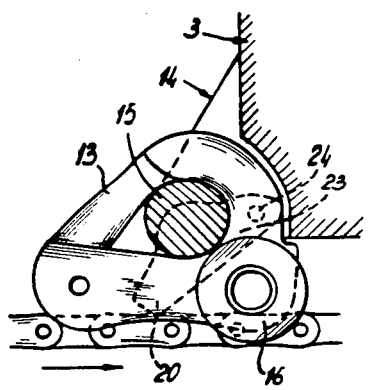
FIGS. 19 and 20 illustrate the functioning of the movable pawl in the engaging means during the unloading of a container.
Figure 20:
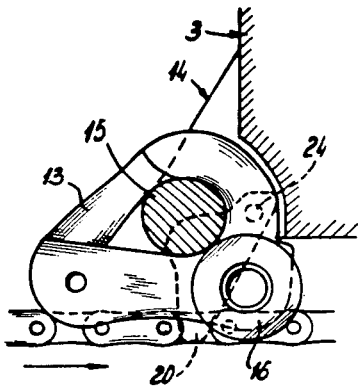

An embodiment not having this disadvantage is illustrated in FIGS. 14 through 18. FIGS. 14 through 17 illustrate this embodiment of the engaging member in the same stages as illustrated in FIGS. 7 through 10, whereas FIG. 18 illustrates a perspective view of this second embodiment. In this second embodiment the engaging member comprises an elongated pawl 23 positioned between both hook-shaped side sections of the engaging member and connected through a transversal pivot shaft 24 to both side sections. The other end of the pawl 23 carries the ridge 20 which in the situation of FIG. 14 extends in the same way as the ridge 20 illustrated in FIG. 7. If during the loading procedure the ridge 20 becomes inserted directly into an intermediate space between the link elements of the chain 8, then there is, with reference to the functioning of the ridge 20 during the various stages of the loading procedure illustrated in FIGS. 14 through 17 no difference with the stages illustrated in FIGS. 7 through 10. If, however, the ridge comes to rest on a part of the link elements and, notwithstanding the self-seeking character of the ridge, will not become inserted into an intermediate space, then because of the pivot shaft 24 the ridge 20 may carry out a rotational movement and may take the position as illustrated in FIG. 19. The movable rotatable ridge 23 does not hamper the loading movement of the container in any way and cannot lead to any damage or wear both of the chain 8 as well as of the ridge 23 itself. At the start of the unloading procedure the chain 8 will be moved in relation to the engaging element 10, so that after a mutual displacement of a few millimeters the pawl 23 will rotate around the shaft 24 whereby the ridge-shaped end 20 of this pawl will become inserted into the intermediate space between the link elements of the chain and will take the position as illustrated in FIG. 20. Further anti-clockwise rotation of the pawl 23 is in this further embodiment of the engaging member prevented so that the engaging member in the same way as already is discussed with reference to FIGS. 7 through 11 is moved to the right as result of the cooperation between the chain 8 and the ridge 20, so that the container 3 is pushed off the vehicle.

Figure 21:
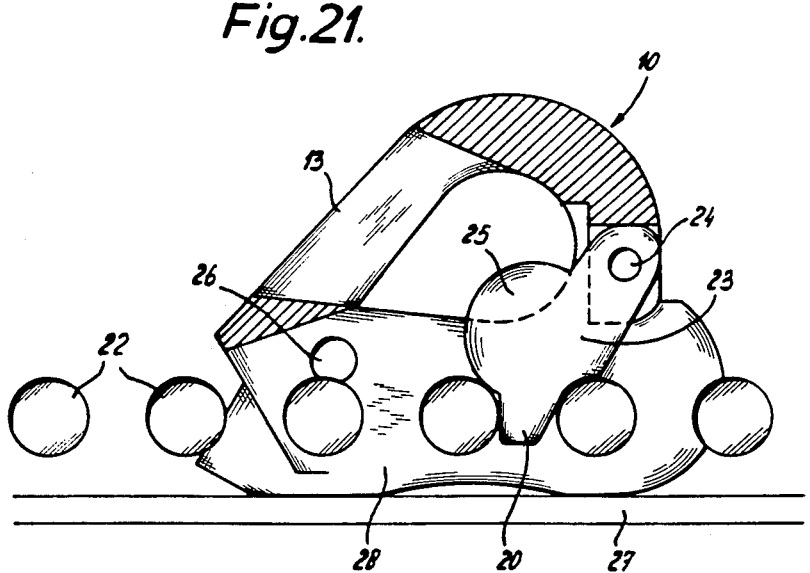
FIG. 21 shows a further developed variant of the second embodiment of the engaging member.

A further developed variant of the second embodiment of the engaging member is illustrated in FIG. 21. As shown in FIG. 21, the engaging member has a pronounced thickened section 25 of pawl 23. Those skilled in the art will appreciate that thickened section 25 of pawl 23 will, after pawl 23 becomes inserted into the links of the endless chain, prevent pawl 23 from further rotation in the counterclockwise direction (as viewed in FIG. 21.

Shaft 26 allows coupling of engaging member 10 to the auxiliary chain. Girder 27 forms a portion of the tipping frame of the vehicle.

What is claimed is:

1. Apparatus for loading and unloading an exchangeable platform, container or the like onto and off a tipping frame of a vehicle, the rearward end of said tipping frame being connected through a shaft to the vehicle frame and said tipping frame being tiltable in relation to the vehicle frame by at least one cylinder/piston combination, said tipping frame comprising:
   an endless chain arranged to run around a motor driven chain wheel at one end of the tipping frame and a wheel at the other end of the tipping frame,
   a separate auxiliary tail connected at one end thereof to the endless chain and
   a hook-shaped engaging member connected to the auxiliary tail and engageable by the platform, container or the like, the engaging member including a section having a ridge which during unloading of the exchangeable platform, container or the like will become inserted between the link elements of the endless chain, such that during unloading the movement of said endless chain is transferred through said inserted ridge of said section of the engaging member to said engaging member and through said engaging member to the exchangeable platform, container or the like.

2. An apparatus according to claim 1, wherein said section of the engaging member having a ridge is pivotably connected to the engaging member such that the ridge is able to move between a position in which the ridge is inserted between the link elements of the endless chain and a position in which the link elements are free to pass said ridge.

3. An apparatus according to claim 2, wherein the engaging member is substantially U-shaped and said section thereof having a ridge is in the shape of an elongated pawl which is positioned between the legs of the U-shaped engaging member and one end thereof is pivotably connected to the engaging member, and the other end thereof comprises said ridge.

4. An apparatus according to claim 3, wherein when the ridge is inserted between the link elements of the endless chain said elongated pawl defines an angle with that part of the endless chain between said pawl and the rear end of the tipping frame which is smaller than 90°.

5. An apparatus according to claim 3 or 4, further comprising:
a weight element mounted on the elongated pawl such that when the ridge is inserted between the link elements of the endless chain the weight element is on said elongated pawl at the side thereof directed to the front side of the tipping frame.

6. An apparatus according to claim 1 wherein said section of the engaging member having a ridge comprises a plurality of ridges of which the mutual distance between adjacent ridges is an integral multiple of the distance between adjacent link elements of the endless chain.

7. An apparatus according to claim 1 wherein the ridge is inserted into the link elements of the endless chain approximately beneath the point of contact between the engaging member and the platform, container or the like.

8. An apparatus according to claim 1 wherein the sides of the ridge are rounded off to provide a self-directing nature.

9. A tipping frame comprising:
an endless chain running around a motor-driven chain wheel at one end of the tipping frame and a wheel at the other end of the tipping frame,
a separate auxiliary tail connected to said endless chain and
an engaging member connected to the auxiliary tail at the end of the tail opposite its point of attachment to said endless chain and engagable with a platform, container or the like, which engaging member includes a section having a ridge which during unloading of the exchangeable platform, container or the like will become inserted between the link elements of the endless chain, such that, during unloading, the movement of said endless chain is transferred through said inserted ridge of said section of the engaging member to said engaging member and through said engaging member to the exchangeable platform, container or the like.

10. An apparatus for moving an exchangeable platform onto and off a vehicle equipped with a tipping frame which comprises:
wheels mounted at each end of the tipping frame;
an endless moveable chain entrained around the wheels which comprises two spaced series of mutually coupled, opposed side plates and transversely extending shafts connecting opposing link elements in the spaced series;
an engaging member for engaging an exchangeable platform having a ridge which engages the transversely extending shafts of the moveable chain when the engaging member is in contact with the moveable chain so as to prevent movement of the engaging member relative to the moveable chain when the engaging member is in contact with the moveable chain; and,
a tail connecting the engaging member and the endless moveable chain.

11. An apparatus as recited in claim 10 wherein the ridge is positioned on the engaging member such that when an exchangeable platform is engaged by the engaging member the ridge is directly below the point of engagement on the exchangeable platform when the platform is resting on the tipping frame and the tipping frame is not tipped relative to the vehicle.

12. An apparatus as recited in claim 10 wherein the ridge has rounded edges so as to guide the ridge into engagement with the transversely extending shafts of the moveable chain when the engaging member is brought into contact with the moveable chain.

13. An apparatus as recited in claim 10 wherein the engaging member comprises a directioning upright wedge-shaped section and hooks on either side of the wedge-shaped section.

14. An apparatus as recited in claim 10 further comprising an exchangeable platform having a coupling element engageable by the engaging member.

15. An apparatus as recited in claim 14 wherein the coupling element comprises two rods spaced apart from each other.

16. An apparatus as recited in claim 15 wherein the engaging member comprises a self-directing wedge-shaped section said wedge-shaped section being accommodated in the space between the two rods when the engaging member engages the coupling element and further comprising hooks on either side of the wedge-shaped section engageable by the rods.

17. An apparatus as recited in claim 16 wherein the engaging member is pivotable about the rods of the coupling element and lockable to the fastening element when pivoted between 45° and 90° relative to the coupling element.

18. An apparatus as recited in claim 14 wherein the coupling element of the exchangeable platform comprises a locking element when the platform has been completely moved onto the vehicle.

19. An apparatus as recited in claim 10 further comprising circular guiding sections mounted on either side of the engaging member such that when the engaging member is in engagement with an exchangeable platform and the platform is moved onto the tipping frame by means of the engaging member, the circular guiding sections contact the tipping frame and support the engaging member on the frame.

20. An apparatus as recited in claim 10 wherein the ridge is pivotally mounted on the engaging member.

* * * * *